United States Patent [19]

Müller et al.

[11] Patent Number: 5,259,642
[45] Date of Patent: Nov. 9, 1993

[54] MOUNT OF A FRONT SEAT PASSENGER AIRBAG UNIT

[75] Inventors: Manfred Müller, Deizisau; Wolfgang Henseler, Tübingen; Thomas Fischer, Calw-Stammheim; Hans-Wilhelm Uphues, Magstadt; Zivojin Petkovic, Böblingen, all of Fed. Rep. of Germany

[73] Assignee: Mercedes-Benz AG, Fed. Rep. of Germany

[21] Appl. No.: 833,670

[22] Filed: Feb. 11, 1992

[30] Foreign Application Priority Data

Mar. 2, 1991 [DE] Fed. Rep. of Germany ....... 4106685

[51] Int. Cl.⁵ ............................................. B60R 21/20
[52] U.S. Cl. .................................... 280/732; 280/730
[58] Field of Search ....................... 280/728, 730, 732

[56] References Cited

U.S. PATENT DOCUMENTS

| 2,755,125 | 7/1956 | Hodges | 280/732 X |
| 3,130,807 | 4/1964 | McHenry | 280/732 X |

FOREIGN PATENT DOCUMENTS 2043255  3/1971  Fed. Rep. of Germany .
2334549  2/1974  Fed. Rep. of Germany .
4016681 11/1990  Fed. Rep. of Germany .

*Primary Examiner*—Joseph D. Pape
*Attorney, Agent, or Firm*—Evenson, McKeown, Edwards & Lenahan

[57] ABSTRACT

The application relates to a mount of a front seat passenger airbag unit in the upper area of a dashboard of a motor vehicle. The mount uses a holder which consists of flat material and on the one hand can be attached to the housing of the airbag unit and on the other hand can be attached securely to the vehicle. In order to ensure a certain degree of resilience of the airbag unit during the unfolding of the bag, the holder, which is made of a flat material, is guided along below the floor area of the housing and is connected there to the latter. The holder projects beyond the housing, on both sides and is attachable securely to the vehicle at a spacing from said housing in such a way that between the lateral ends of the housing and the mounting points of the holder fixed to the vehicle at a distance from the housing. The holder forms a deformable bridge area which serves to absorb energy and during loading permits the holder to rotate in both directions about its longitudinal axis.

6 Claims, 1 Drawing Sheet

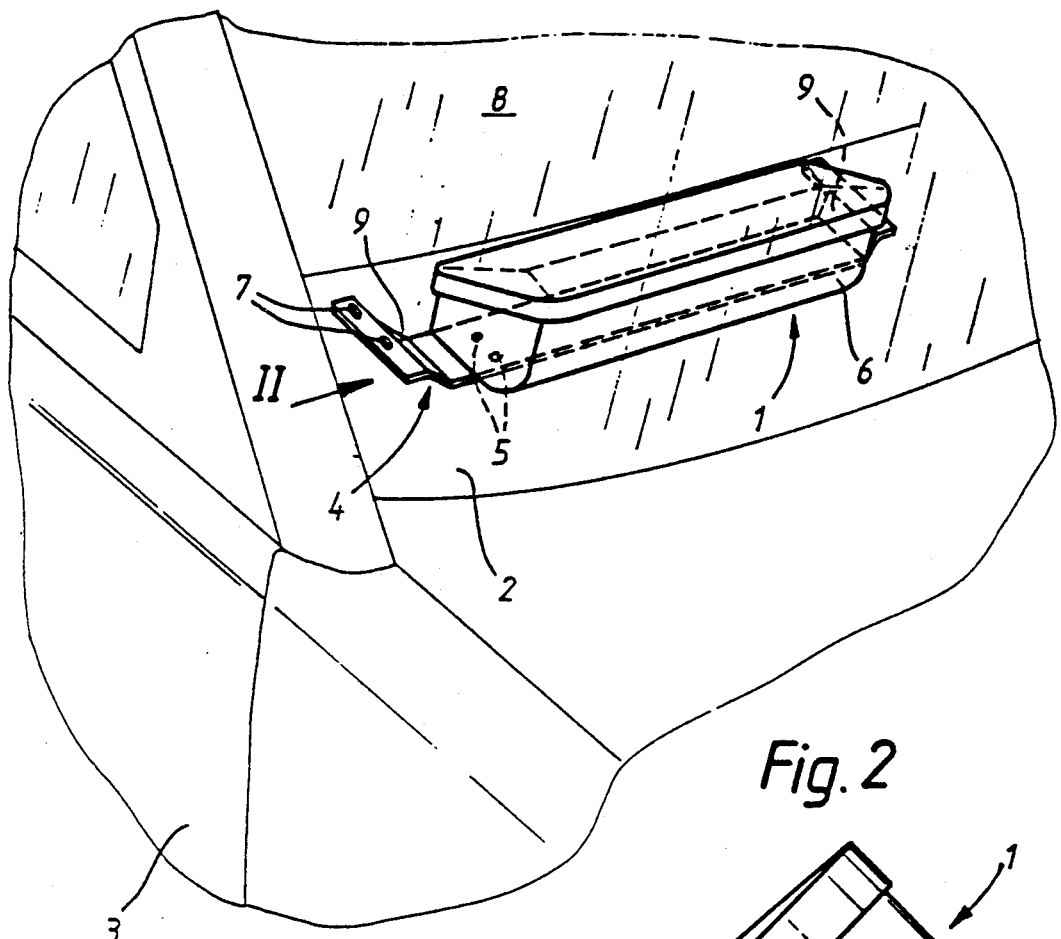
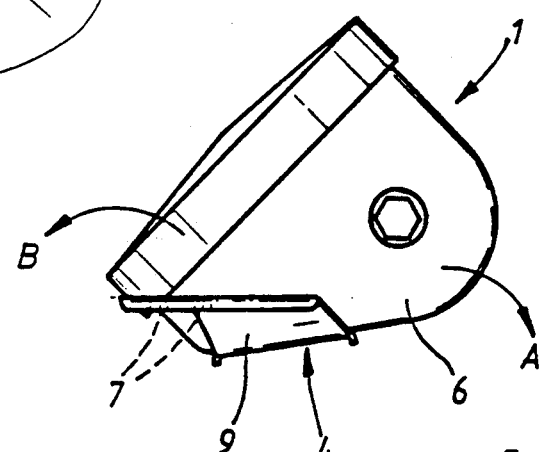
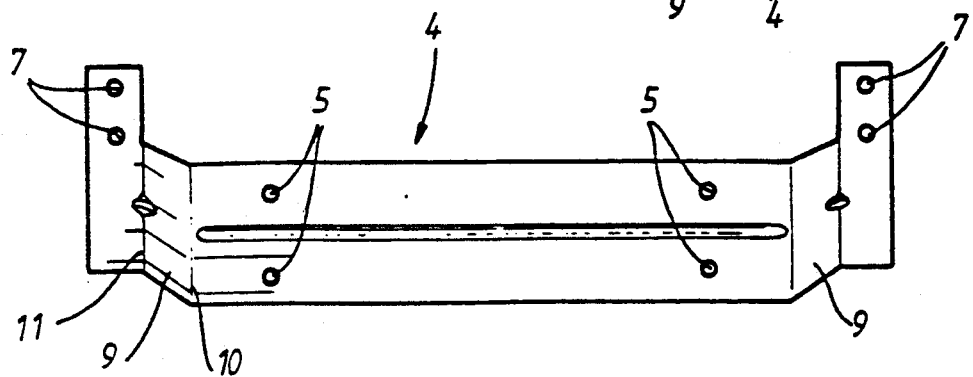

MOUNT OF A FRONT SEAT PASSENGER AIRBAG UNIT

BACKGROUND AND SUMMARY OF THE INVENTION

The invention relates to the mount of a front seat passenger airbag unit in the upper area of a dashboard of a motor vehicle by means of a holder which consists of flat material and on the one hand can be attached to the housing of the airbag unit and on the other hand can be attached securely to the vehicle.

An arrangement of this kind is already disclosed in German Patent Document DE 40 16 681 A1.

During the folding process of an airbag of this kind two effects occur which are undesired or disadvantageous. Thus, in a first phase the unfolding airbag comes into contact with the windscreen which can lead to the latter being damaged. Furthermore, in a later phase high inertial forces occur during the slowing down of the unfolded airbag which are transmitted into the housing via the airbag connection and to the module connection.

The present invention is therefore based on the object of designing a mount of a front seat passenger airbag unit in such a way that these negative phenomena are counteracted.

This object is achieved in a mount of the type referred to above, constructed according to the invention in such a way that the holder consisting of a flat steel plate guided along below the floor area of the housing and connected there to the housing, with the steel plate projecting beyond the housing on both sides and being attached securely to the vehicle at a spacing from the housing in such a way that between the lateral ends of the housing and the mounting points of the holder, arranged fixed to the vehicle at a distance from the housing, the holder forms a deformable bridge area which serves to absorb energy and during loading permits the holder to rotate in both directions about its longitudinal axis.

Other objects, advantages and novel features of the present invention will become apparent from the following detailed description of the invention when considered in conjunction with the accompanying drawings.

BRIEF DESCRIPTION OF THE DRAWINGS

FIG. 1 shows a perspective view of a front seat passenger airbag unit viewed from the outside through the windscreen;

FIG. 2 shows a view in the direction of the arrow II in FIG. 1; and

FIG. 3 shows a top view of the holder on a larger scale.

DETAILED DESCRIPTION OF THE DRAWINGS

A front seat passenger airbag unit 1 is arranged in the upper area of a dashboard 2 of a motor vehicle 3 of which areas are shown in FIG. 1. Its mount in the vehicle is a holder 4 which is manufactured from flat steel and is bolted at the points 5 to the housing 6 of the airbag unit 1 and at the points 7 to a component (not illustrated) which is fixed to the vehicle.

In order to permit a certain degree of swivelling of the airbag unit 1 in the direction of the arrow 'A' when there is contact of the unfolding airbag (not illustrated) with the windscreen 8 and to permit a certain degree of swivelling in the direction of the arrow 'B' during the slowing down of the unfolded airbag, the holder 4 is constructed in a special manner.

Specifically, the holder 4 projects beyond the housing 6 on both sides in the transverse direction of the vehicle, the mounting points 5 and 7 are located at a distance from one another in the transverse direction of the vehicle and between them the holder 4 forms a deformable or rotatable bridge area 9 which serves to absorb energy and during the corresponding loading of the airbag unit 1 permits the holder 4 to rotate both in the direction of the arrow 'A' and in the direction of the arrow 'B' (FIG. 2).

In the bridge area 9, the holder 4 has in each case a doubled angled-off portion 10, 11 in such a way that the vehicle-side mounting points are located at a higher point in the installation position than the housing-side mounting points 5.

Finally, the construction of the holder 4 and the arrangement of the mounting points are matched to one another in such a way that, viewed in the longitudinal direction of the vehicle, the vehicle-side mounting points 7 have an offset with respect to the housing-side mounting points 5.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Mount of a front seat passenger airbag unit in the upper area of a dashboard of a motor vehicle, comprising:
 a substantially flat holder which is attached securely to the vehicle in a manner that allows the holder to rotate about a longitudinal axis; and
 a housing for containing an airbag, attached to the holder, wherein the holder is guided along below a floor area of the housing and is connected there to the housing, wherein the holder projects beyond the housing on both sides and is attached securely to the vehicle at a spacing from the housing in such a way that between the lateral ends of the housing and mounting points of the holder to the vehicle at a distance from said housing, said holder forms a deformable bridge area which serves to absorb energy and during loading permits the holder to rotate in both directions about a longitudinal axis of the holder.

2. Mount according to claim 1, wherein the holder extends in such a way in its areas projection laterally beyond the housing that its vehicle-side mounting points also have in the longitudinal direction of the vehicle an offset with respect to the housing-side mounting points.

3. Mount according to claim 1, wherein the holder has in its areas projecting laterally beyond the housing in each case a doubled angled-off portion, in such a way that the vehicle-side mounting points are located at a higher point in the installation position than the housing-side mounting points.

4. Mount according to claim 1, wherein the holder is guided through in one piece over its entire length below the housing.

5. Mount according to claim 2, wherein the holder is guided through in one piece over its entire length below the housing.

6. Mount according to claim 3, wherein the holder is guided through in one piece over its entire length below the housing.

* * * * *